United States Patent
Bu et al.

(10) Patent No.: US 8,159,079 B2
(45) Date of Patent: Apr. 17, 2012

(54) ENVIRONMENTAL ENERGY-SAVING POWER GENERATOR

(75) Inventors: Der-Guey Bu, Miaoli County (TW); Kuo-Cheng Chung, Miaoli County (TW)

(73) Assignee: Suhder Industrial Co., Ltd., Miaoli County (TW)

( * ) Notice: Subject to any disclaimer, the term of this patent is extended or adjusted under 35 U.S.C. 154(b) by 617 days.

(21) Appl. No.: 12/427,119

(22) Filed: Apr. 21, 2009

(65) Prior Publication Data
US 2010/0264653 A1 Oct. 21, 2010

(51) Int. Cl.
*H02K 7/18* (2006.01)
*H02P 9/04* (2006.01)

(52) U.S. Cl. .......... 290/1 A; 290/6; 290/40 B; 290/40 R
(58) Field of Classification Search ............. 290/1 A, 290/6, 40 B, 40 R
See application file for complete search history.

(56) References Cited

U.S. PATENT DOCUMENTS
2005/0012336 A1* 1/2005 Dull et al. .............. 290/1 A
2008/0225562 A1* 9/2008 Mashra et al. ........... 363/102

FOREIGN PATENT DOCUMENTS
JP 2007306700 A * 11/2007
* cited by examiner

*Primary Examiner* — Quyen Leung
*Assistant Examiner* — Jose Gonzalez Quinones
(74) *Attorney, Agent, or Firm* — Ming Chow; Sinorica, LLC

(57) ABSTRACT

An environmental energy-saving power generator includes a power generation module, a control module, a power module, a power generator housing, and an I/O module. A processor unit of the control module controls the power management unit and the power management unit controls the power module to supply driving power required by a drive unit of the power generation module during operation; after the power generation unit of power generation module operates, the surplus power generated by the power generation unit, when generating power, can be re-charged to the power module. The environmental energy-saving power generator effectively manages and allocates the power of power module and that of power generation module to lengthen the time when the environmental energy-saving power generator supplies power to the load for operation. The power generation units of power generation module and the drive unit may generate high-efficiency power of voltage, current, and frequency.

9 Claims, 5 Drawing Sheets

ENVIRONMENTAL ENERGY-SAVING POWER GENERATOR

BACKGROUND OF THE INVENTION

1. Field of the Invention

This invention relates to a power generator and particularly to an environmental energy-saving power generator with high capability of power generation.

2. Description of the Prior Art

When a power generator, a consumable fuel is used to convert heat energy into a required electric energy, or a natural energy, such as solar power, wind power, hydraulic power, is converted into a required energy. The power generator consuming the fuel is further widespread in daily life. Environmental protection is valued recently, so the industries of solar power generation and wind power generation depending on the natural energy source are developed like the sun at high noon.

Consequently, because of the technical defects of described above, the applicant keeps on carving unflaggingly through wholehearted experience and research to develop the present invention, which can effectively improve the defects described above.

SUMMARY OF THE INVENTION

However, although supplying enough power to large machinery, a conventional power generator consuming fuel or a conventional solar power generator or wind power generator using natural energy has no longer a small physical volume. Thus, it is indeed necessarily improved if being applied to a bicycle, a motor car, an air conditioner, small and medium electrical appliance, and a lighting apparatus.

An environmental energy-saving power generator comprises a power generation module, a control module, a power module, a power generator housing, and an I/O module. A processor unit of the control module controls the power management unit and thus the power management unit is made to control the power module to supply driving power required by a drive unit of the power generation module during operation; after the power generation unit of power generation module operates, the surplus power generated by the power generation unit, when generating power, may be re-charged to the power module. The power generation modules of portable environmental energy-saving power generator may be connected in parallel to generate power.

Through the power management unit of control module, the environmental energy-saving power generator according to this invention effectively manage allocate the power of power module and that of power generation module to lengthen the time when the environmental energy-saving power generator supplies power to the load for operation. Besides, the power generation units of power generation module and the drive unit can generate high-efficiency power of voltage, current, and frequency, so the environmental energy-saving power generator is made to not only supply green environmental, carbon-free energy, but also lengthen the load operation time and reduce the physical volume.

DETAILED DESCRIPTION OF THE PREFERRED EMBODIMENTS

Figure 1:
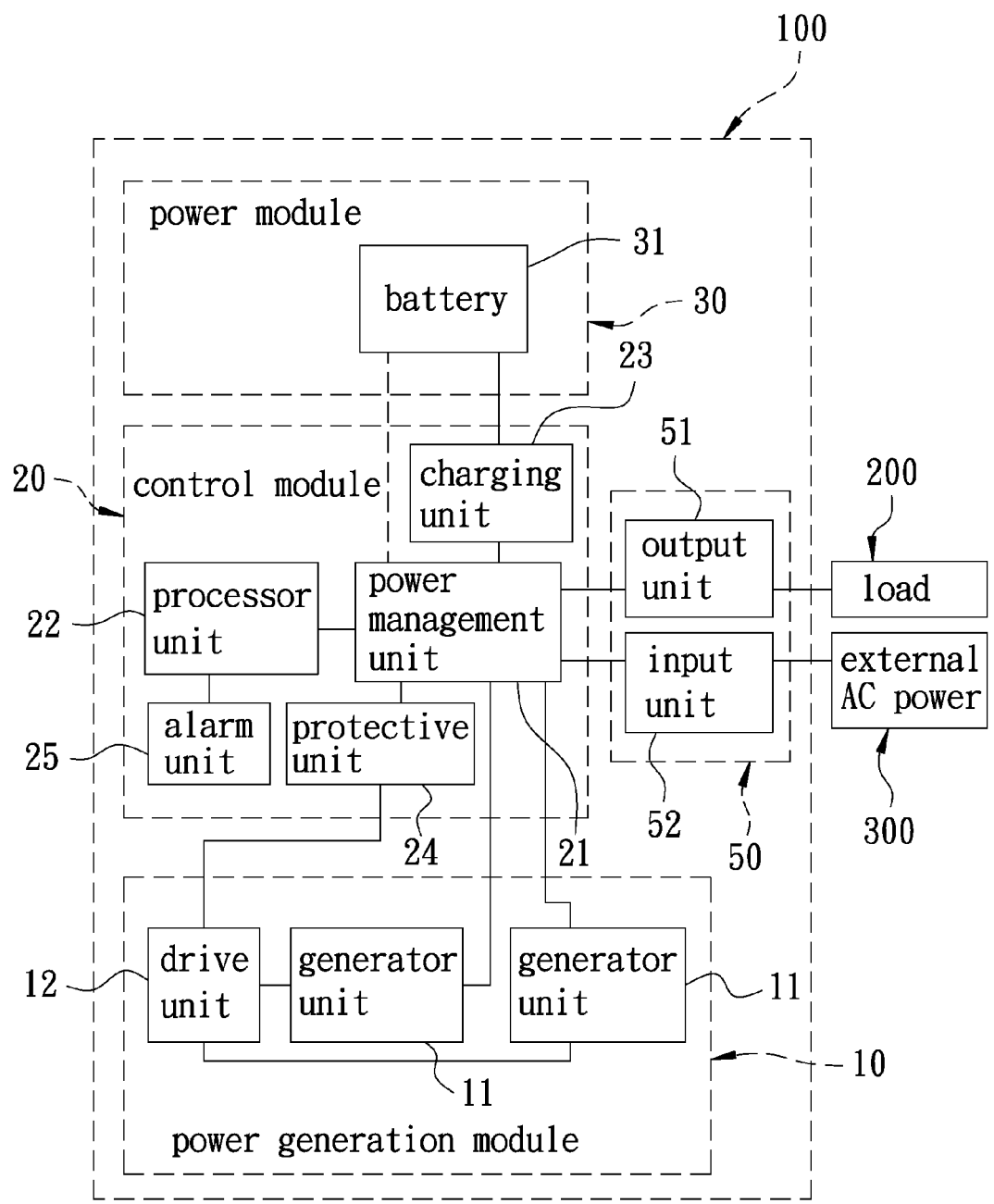
FIG. 1 is a circuit block diagram of an environmental energy-saving power generator according to this invention.

Now, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Firstly, with reference to FIG. 1 through FIG. 4 illustrating preferred embodiments of an environmental energy-saving power generator 100 according to this invention, the environmental energy-saving power generator 100 is connected to several loads 200, supplies power to the loads 200, and lengthen the operation time of the loads 200, and can also be connected to an external AC power 300 for charging. The environmental energy-saving power generator 100 mainly comprises a power generation module 10, a control module 20, a power module 30, a power generator housing 40, and an I/O module 50.

Figure 2:
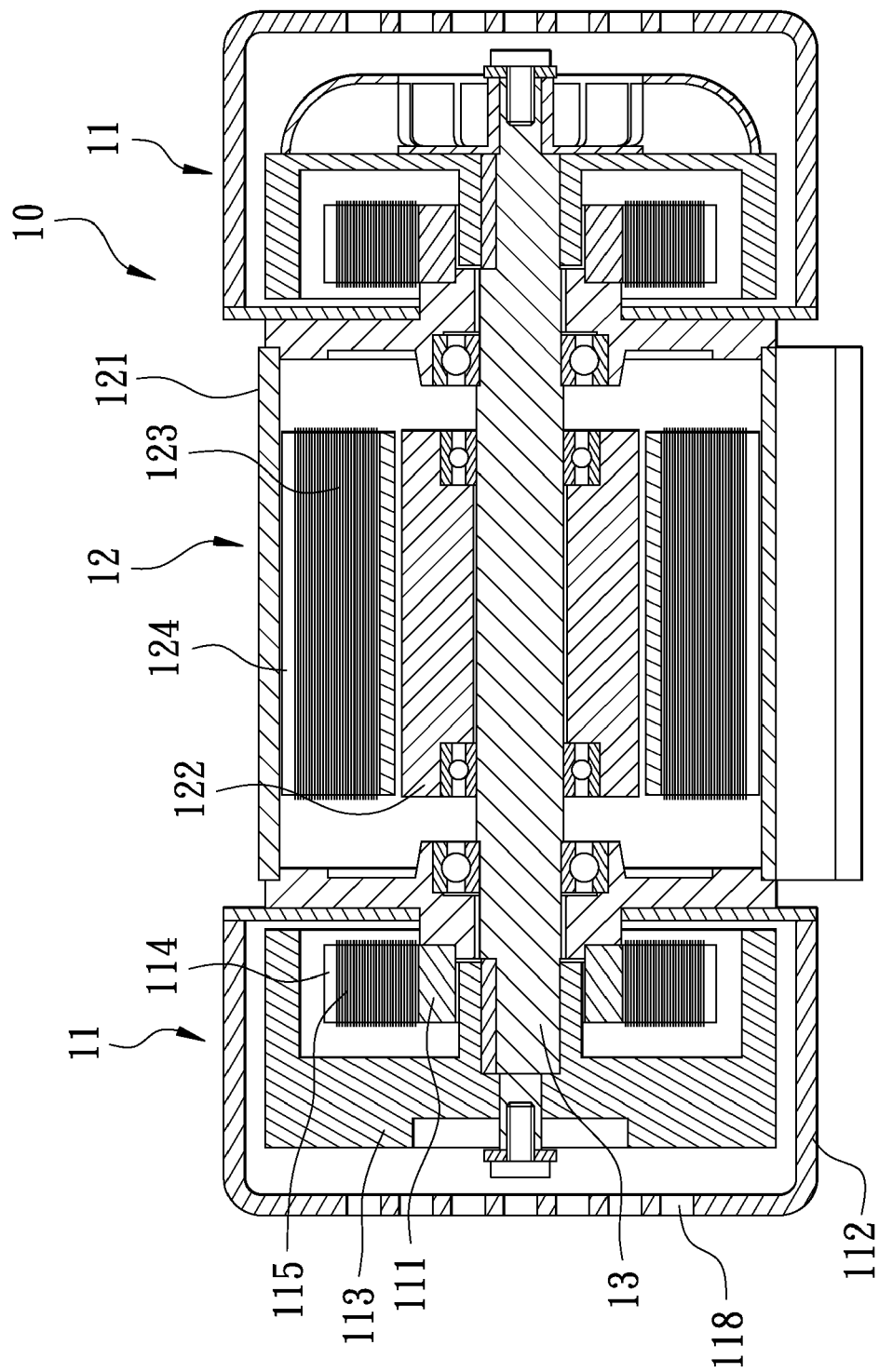
FIG. 2 is a sectional view of a power generation module in a preferred embodiment of this invention.
Figure 3:
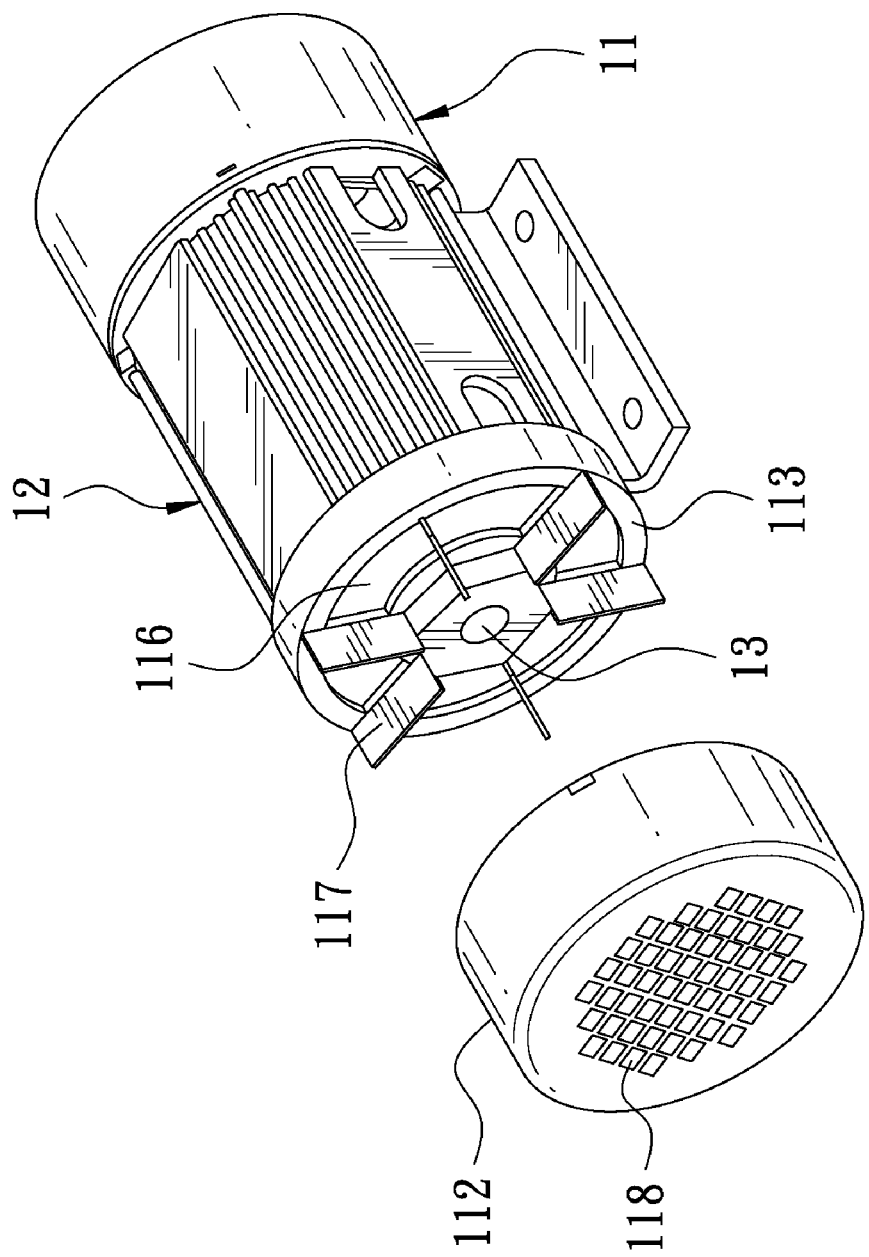
FIG. 3 is a 3D sectional view of part of the power generation module in a preferred embodiment of this invention.
Figure 4:
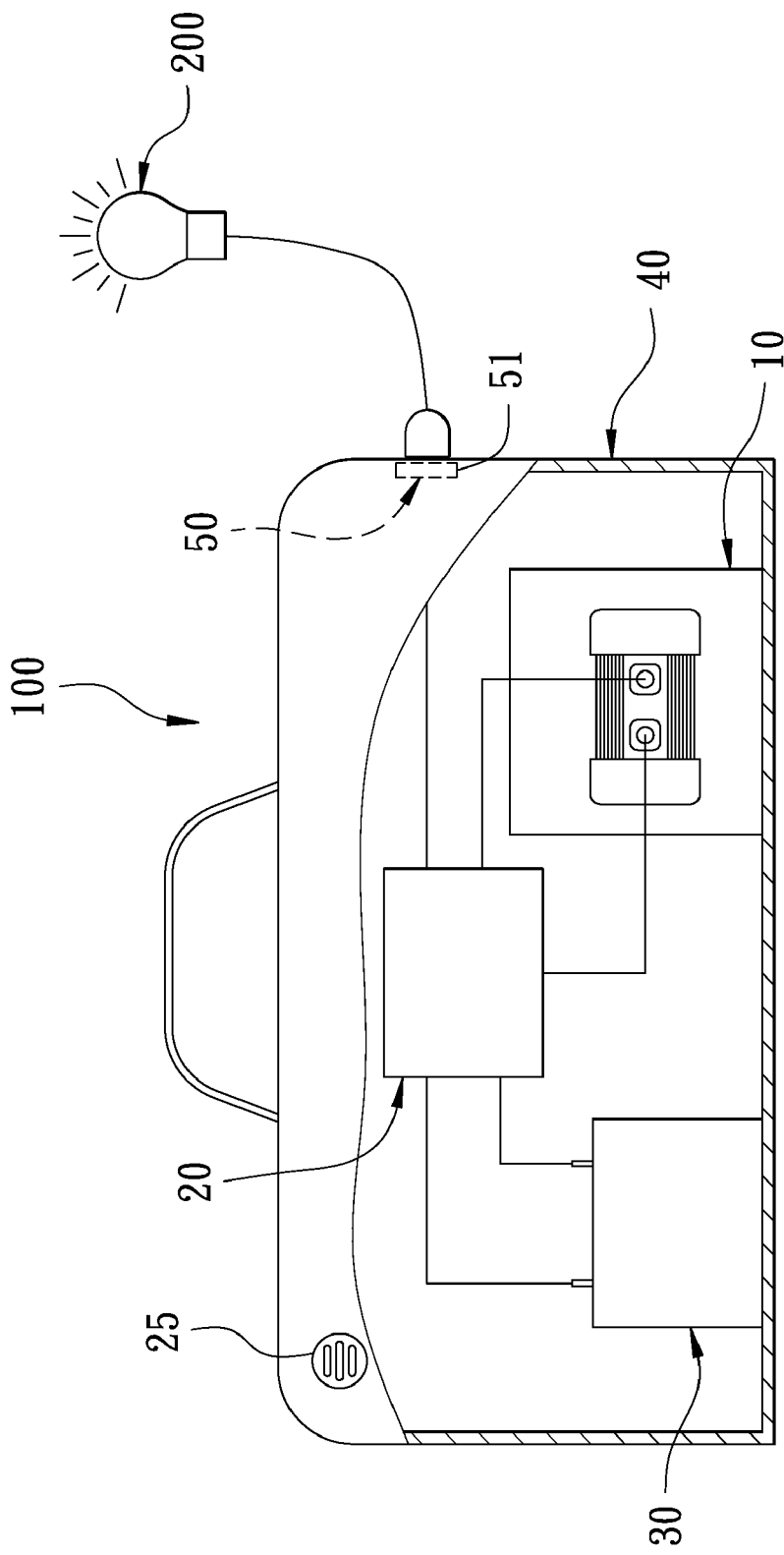
FIG. 4 is a schematic view illustrating a service state of the environmental energy-saving power generator in a preferred embodiment of this invention.

The power generation module 10 comprises two generator units 11 and a drive unit 12. Each power generator unit 11 further comprises a power generation stator 111, a housing 112, and a power generation rotor 113. The power generation stator 111 is formed with silicon steel plates that are superimposed, outside which several power generation magnetic poles 114 are formed. Several power generation magnetic-pole coils 115 are formed wrapping around the power generation magnetic poles 114. A shaft 13 is provided axially pivoting around the center of power generation stator 111. The power generation rotor 113 is concentrically mounted onto the shaft 13, the power generation stator 111 is housed in the power generation rotor 113, and when running, the power generation rotor 113 structured with a multi-pole permanent magnet 113 can cut the magnetic lines of force caused by the power generation magnetic-pole coils of the power generation stator 111 to generate power, and thus the power generator unit 11 is made to convert magnetic energy into electric energy. The power generator units 11 are separately provided at two sides of the shaft 13 and, with reference to FIG. 3, the power generation rotor 113 is provided with several axial heat dissipation holes 116. Heat dissipation blades 117 are each formed between the heat dissipation holes 116 each of which stretches. The heat dissipation blades 117 are combined with the power generation rotor 113 in one. Further, the circumference of power generation rotor 113 is covered by the housing 112. The housing 112 is axially formed with several thru holes 118. The thru holes 118 are opposite to the heat dissipation holes 116 and the heat dissipation blades 117. Thus, heat energy generated by the operating power generator unit 11 is vented out. With reference to FIG. 2, the drive unit 12 coaxially pivots on the shaft 13 and lies between the power generator units 11. The drive unit 12 further comprises a housing 121, a multi-pole drive rotor 122, and a drive stator 124 provided with several drive magnetic-pole coils 123. The multi-pole drive rotor 122 is coaxially mounted onto the shaft 13 of the power generator unit 11. The drive stator 124 coaxially pivots around the outer circumference of multi-pole drive rotor 122, making the drive stator 124 drive the multi-pole drive rotor 124 by means of the magnetic lines of force that are caused by the drive magnetic-pole coils 123. The housing 121 wraps around the outer circumference of drive stator 124 for tight fixing. In a preferred embodiment of this invention, the drive unit 12 is further a DC brushless motor and a drive controller driving the DC brushless motor. The drive unit can be connected to an AC motor.

Again with reference to FIGS. 1 and 4, the control module 20 is connected to the power generation module 10 for operation control and is further electrically connected through a power management unit 21 to a processor unit 22, a charging unit 23, and a protective unit 24. The processor unit 22 is used to mainly control the power management unit 21, driving the power management unit 21 to manage the electric energy consumed and generated by the environmental energy-saving power generator 100. The processor unit 22 is connected to control an alarm unit 25 so that the processor unit 22 can send an alarm signal when receiving an abnormal signal transmitted by the power management unit 21. In the preferred embodiment of this invention, the alarm unit 25 is an annunciator that is a warning lamp or a buzzer. Further, the protective unit 24 is used to detect whether the electrical loop of environmental energy-saving power generator 100, when operating, is abnormal, and send the detection result back to the power management unit 21. In the preferred embodiment of this invention, the protective unit 24 is a temperature sensor.

The power module 30 comprises a battery 31. The power module 30 is connected to the power management unit 21 of control module 20 to supply electric power to the power management unit 21, and to the charging unit 23 to store the electric power allocated and supplied by the power management unit 21 in the power module 30.

The power generator housing 40 can house the power module 30, the control module 20, and the power module 10.

The I/O module 50 is provided in the power generator housing 40 and is made up with an output unit 51 and an input unit 52 that are electrically connected to the power management unit 21, in which the output unit 51 is connected to the loads 200 and the input unit 52 is connected to an input terminal of another external AC power 300.

With reference to FIGS. 1 and 2, in the environmental energy-saving power generator 100, the power module 30 supplies power to the drive unit 12 of power generation module 10 so as to make the drive unit 12 drive the connected power generator unit 11; thus, the drive magnetic-pole coils 123 on the drive stator 124 of drive unit 12 is made to generate the magnetic lines of force, and with the variation of sine-wave frequency, the polarity caused by the drive magnetic-pole coils 123 varies to make the multi-polarity drive rotor 122 sense the variation of magnetic lines of force of drive stator 124, thereby the multi-polarity drive rotor 122 being made to correspondingly run. The multi-polarity drive rotor 122 synchronously has the shaft 13 run arranged in the central axis. The shaft 13 turns the power generation rotors 113 of the power generator unit 11 that are arranged at two sides of the drive unit 12. When the power generation rotors 113 run, because the magnetic lines of force cut the power generation stators 111, the power generation magnetic-pole coils 115 of the power generation stators 111 are made to generate induction current; thus, the power generator units 11 are made to supply the power to the load 200 of power generator unit 11. When the power generator unit 11 supplies excessive power, the power management unit 21 of control module 20 re-charges the battery 31 of power module 30 with the surplus power through the charging unit 23. Further, with reference to FIG. 1, when the power of power module 30 of the environmental energy-saving power generator 100 is not enough, an external AC power 300 can be connected, and the power management unit 21 re-charges the battery 31 of power module 30 with the power supplied by the AC power source 300 through the charging unit 23.

Figure 5:
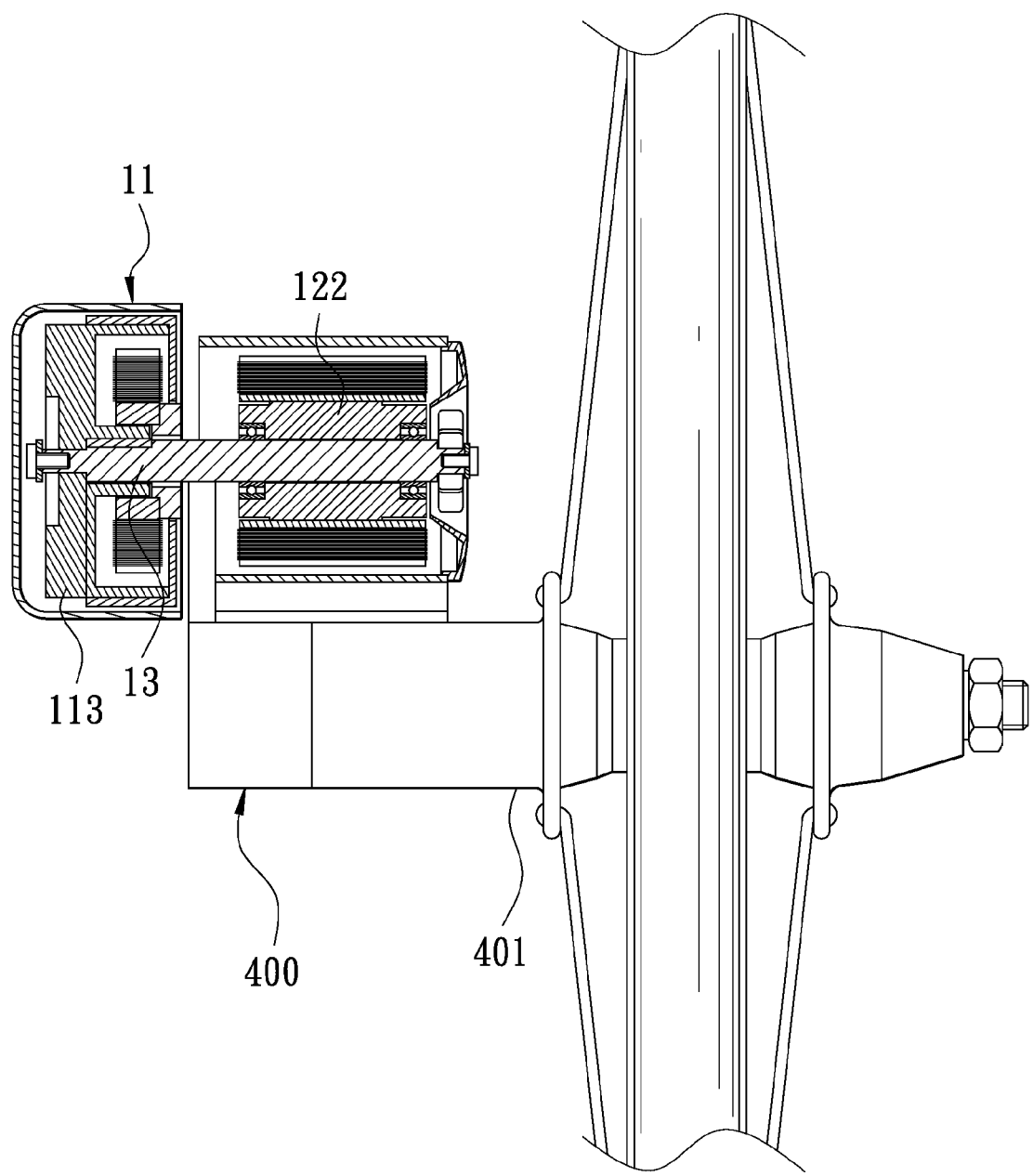
FIG. 5 is a sectional assembly view of part of the environmental energy-saving power generator in another preferred embodiment of this invention.

With reference to FIG. 5 illustrating another embodiment of this invention, the major structure and effect of environmental energy-saving power generator 100 is the same as that in the previous preferred embodiment, so unnecessary details are not given here. The drive unit 12 is further connected to a speed change device 400. The speed change device 400 is connected to a power wheel 401 driving the power wheel 401 to turn the drive rotor 122 and the shaft 13 and driving the power generation rotor 113 to run. Thus, when the power wheel 401 runs, the power generator unit 11 may be driven to generate power.

From the description made above, the features and virtues of the invention that can be achieved are arranged below.

1. The environmental energy-saving power generator according to this invention can generate the high-efficiency power of voltage, current, and frequency; thus, stable sine-wave frequency may be outputted and subsequently converted into power for use.
2. The power required by the drive unit of environmental energy-saving power generator according to this invention is supplied by a secondary cell and driven by no external energy; thus, it is featured with small physical volume and easy assembly and installation.
3. In the environmental energy-saving power generator according to this invention, several sets of power generation modules can be connected in parallel to generate power, and a single drive unit is used to drive the power generation modules and make the power generation modules generate required power.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An environmental energy-saving power generator, being connected to at least one load, supplying power required by the loads, and lengthening the operation time of the loads, and mainly comprising:

a power generation module mainly comprising at least one power generator unit and one drive unit, in which the power generator unit further comprises a power generation stator, a housing, and a power generation rotor, the power generation stator is formed with silicon steel plates that are superimposed, outside which several power generation magnetic poles are formed, several power generation magnetic-pole coils are formed wrapping around the power generation magnetic poles, a shaft is provided axially pivoting around the center of power generation stator, the power generation rotor is concentrically mounted onto the shaft, the power generation stator is housed in the power generation rotor, and when running, the power generation rotor structured with a multi-pole permanent magnet cuts the magnetic lines of force caused by the power generation magnetic-pole coils of the power generation stator to generate power, and thus the power generator unit is made to convert magnetic energy into electric energy, the power generation rotor is provided with several axial heat dissipation holes, heat dissipation blades are each formed between the heat dissipation holes each of which stretches, the heat dissipation blades are combined with the power generation rotor in one, the circumference of power generation rotor is covered by the housing, the housing is axially formed with several thru holes, the thru holes are opposite to the heat dissipation holes and the heat dissipation blades, heat energy generated by the operating power generator unit is thus vented out, the drive unit coaxially pivots on the shaft of power generation module, the drive unit further comprises a housing, a multi-pole drive rotor, and a drive stator provided with several drive magnetic-pole coils, the multi-pole drive rotor is coaxially mounted onto the shaft of the power generator unit, the drive stator co-axially pivots around the outer circumference of multi-pole drive rotor, making the drive stator drive the multi-polarity drive rotor by means of the magnetic lines of force that are caused by the drive magnetic-pole coils, and the housing wraps around the outer circumference of drive stator;

a control module connected to the power generation module, controlling the power generation to operate, and mainly being electrically connected through a power management unit to a processor unit and a charging unit, in which the processor unit is used to mainly control the power management unit, driving the power management unit to manage the electric energy consumed and generated by the environmental energy-saving power generator;

a power module mainly comprising a battery and being connected to the power management unit of control module to supply electric power to the power management unit, and to the charging unit to store the electric power allocated and supplied by the power management unit in the power module;

a power generator housing covering the power module, the control module, and the power module; and an I/O module being provided in the power generator housing and being made up with an output unit and an input unit that are electrically connected to the power management unit, in which the output unit is connected to the loads and the input unit is connected to an input terminal of another external AC power.

2. The environmental energy-saving power generator according to claim 1, wherein the power generation module comprises two power generator units and each of the power generator units co-axially pivots to two ends of the drive unit.

3. The environmental energy-saving power generator according to claim 1, wherein the drive unit is further connected to a speed change device and thus to the power wheel of a vehicle to drive the shaft.

4. The environmental energy-saving power generator according to claim 1, wherein the drive unit further comprises a drive controller and a DC brushless motor that is driven.

5. The environmental energy-saving power generator according to claim 1, wherein the drive unit is further an AC motor.

6. The environmental energy-saving power generator according to claim 1, wherein the processor unit is connected to control an alarm unit and thus the processor unit sends an alarm signal when receiving an abnormal signal transmitted by the power management unit.

7. The environmental energy-saving power generator according to claim 6, wherein the alarm unit is an annunciator that is a warning lamp or a buzzer.

8. The environmental energy-saving power generator according to claim 1, wherein a protective unit is electrically connected between the power management unit and the enable unit, and the protective unit is used to detect whether the electrical loop of environmental energy-saving power generator, when operating, is abnormal, and send the detection result back to the power management unit.

9. The environmental energy-saving power generator according to claim 8, wherein the protective unit is a temperature sensor.

\* \* \* \* \*